United States Patent [19]

Luechinger et al.

[11] Patent Number: 5,092,416
[45] Date of Patent: Mar. 3, 1992

[54] WEIGHING APPARATUS WITH ADJUSTABLE CROSSBAR SUPPORT

[75] Inventors: Paul Luechinger, Uster; Ernst Strickler, Wolfhausen, both of Switzerland

[73] Assignee: Mettler - Toledo AG, Greifensee, Switzerland

[21] Appl. No.: 642,007

[22] Filed: Jan. 16, 1991

[30] Foreign Application Priority Data

Mar. 14, 1990 [CH] Switzerland .......................... 823/90

[51] Int. Cl.$^5$ ........................ G01G 3/08; G01G 21/24
[52] U.S. Cl. ..................................... 177/229; 177/255
[58] Field of Search .............. 177/164, 212, 229, 255, 177/256

[56] References Cited

U.S. PATENT DOCUMENTS

| | | | |
|---|---|---|---|
| 4,245,711 | 1/1981 | Kunz | 177/212 |
| 4,280,577 | 7/1981 | Kunz | 177/212 X |
| 4,311,202 | 1/1982 | Kunz | 177/212 |
| 4,337,838 | 7/1982 | Kunz | 177/212 |
| 4,354,563 | 1/1982 | Luechinger et al. | 177/212 |
| 4,383,586 | 5/1983 | Lee | 177/229 |
| 4,425,975 | 1/1984 | Luechinger | 177/212 X |
| 4,433,740 | 2/1984 | Luechinger | 177/229 X |
| 4,461,364 | 7/1984 | Strickler | 177/255 |
| 4,872,522 | 10/1989 | Kunz | 177/229 |
| 4,938,300 | 7/1990 | Kunz | 177/212 X |
| 4,964,478 | 10/1990 | Stadler et al. | 177/229 |

Primary Examiner—George H. Miller, Jr.
Attorney, Agent, or Firm—Laubscher, Presta & Laubscher

[57] ABSTRACT

Electronic weighing apparatus is provided including a force transmitting lever (17) pivotally suspended from a crossbar (33) that is connected for adjustment relative to the apparatus frame (9). An adjusting screw (45) adjusts the vertical position of the bar relative to a pillar portion (31) of the frame, and a fastening screw (37) serves to rigidly connect the crossbar with the frame following the crossbar adjustment. In this manner, the pivot axis of the transmitting lever is so adjusted as to minimize deflection of the no-load point owing to the inclination of the weighing apparatus.

8 Claims, 2 Drawing Sheets

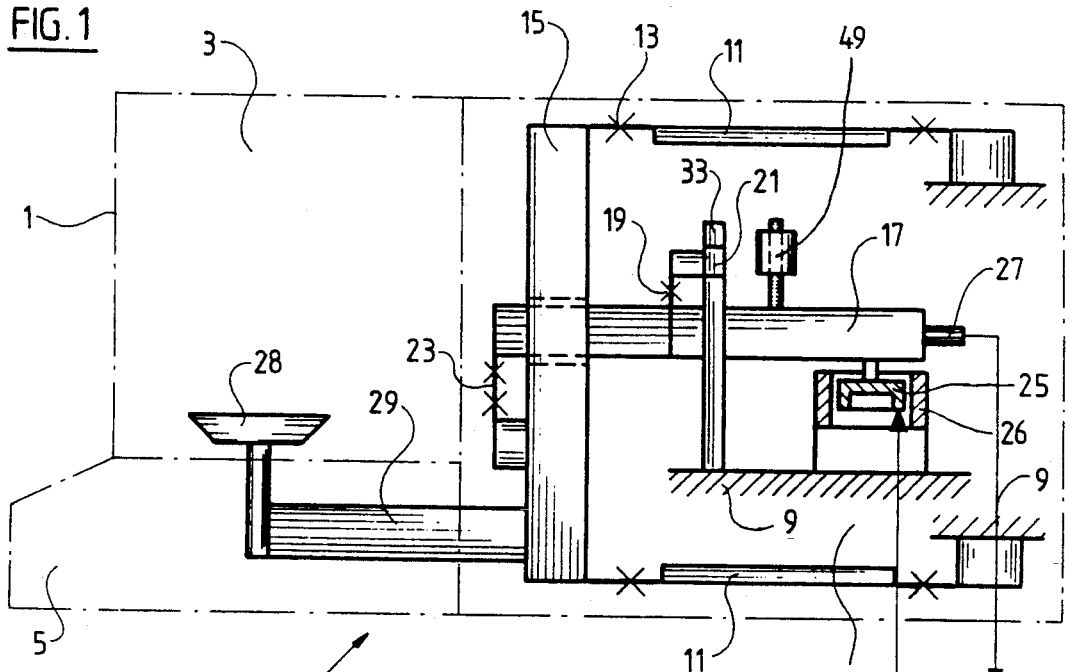
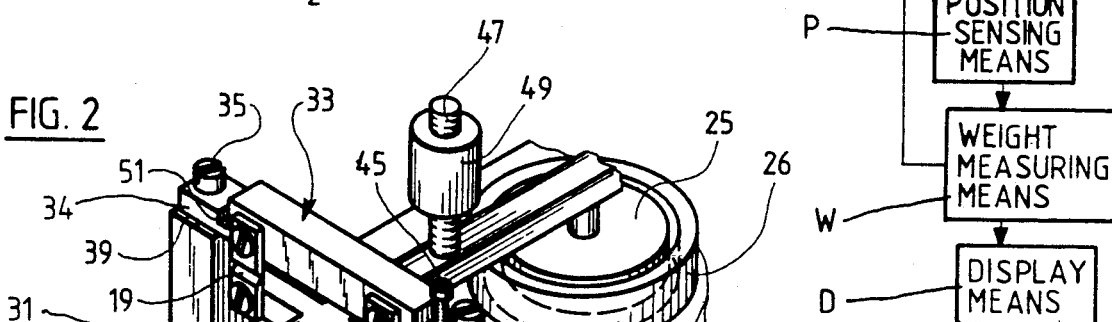
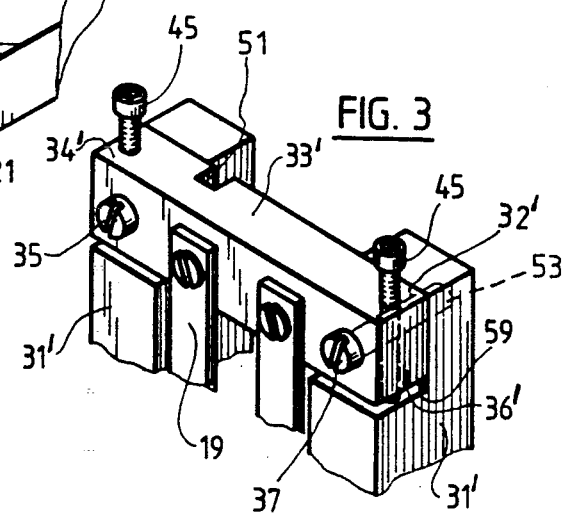

WEIGHING APPARATUS WITH ADJUSTABLE CROSSBAR SUPPORT

STATEMENT OF THE INVENTION

This invention relates to a weighing apparatus having a load-responsive force transmitting lever that is pivotally supported by a crossbar that is adjustably connected with the frame, thereby to compensate for deviations in the no-load point produced by uneven inclinations of the weighing apparatus.

BRIEF DESCRIPTION OF THE PRIOR ART

It is known in the electronic weighing apparatus art to provide a load-receiving member connected by parallel guide means for vertical movement relative to the frame. Examples of such weighing apparatus are shown by the prior Kunz U.S. Pat. Nos. 4,245,711, 4,280,577, 4,311,202, 4,337,838, 4,872,522 and 4,938,300, Luechinger U.S. Pat. Nos. 4,354,563, 4,425,975 and 4,433,740, and Strickler U.S. Pat. No. 4,461,364.

In order to obtain a more accurate measurement, it is common to provide a force transmitting lever for stepping up or amplifying the degree of motion of the load-receiving member, which lever is pivotally connected with the frame for pivotal movement by the load-receiving member. The amplified movement of the force transmitting lever is measured by position-responsive means to afford a measurement of the load applied to the load-receiving means.

It is known in high-resolution scales that undesirable deviations from the no-load zero or null position occur as a consequence of the forces of gravity acting on the system weight—which amounts to between 50 and 100 million times the degree of resolution of the scale—as a consequence of misorientation or inclination of the support means, such as a table. The position of the center of gravity can normally be adjusted with respect to the longitudinal axis by means of a nut that is rotatably arranged on a vertically extended spindle on the weighing bar; as a result of this, the system is essentially rendered indifferent regarding the inclination of the scale along the longitudinal axis.

An inclination of the weighing bar in the lateral direction is mostly due to inaccuracy in the assembly and manufacture of the bending elements. This cannot be corrected by means of the vertically movable nut.

The purpose of the present invention is—in addition to the adjustment of the fact that the zero point level depends on inclinations along the longitudinal axis—to reduce the dependence of the zero point level on the inclination along the lateral axis or generally to make the scale less sensitive with regard to the inclination of the system along both axes.

This problem is solved according to the present invention in that the horizontal crossbar from which the force transmitting lever is pivotally suspended is braced with both of its ends on two fixed support pillars on the scale frame, while the vertical position of at least one of the two ends can be adjusted with respect to the supports.

SUMMARY OF THE INVENTION

Accordingly, a primary object of the present invention is to provide an improved electronic weighing apparatus in which the horizontal crossbar from which the force-transmitting lever is pivotally suspended is adjustably connected with the frame. The pivot axis of the force-transmitting lever can thus be adjusted to a position that is neutral relative to the leveling of the apparatus, thereby facilitating the transfer of forces from the load receiver to the coil without any lateral forces that would otherwise adversely affect the weighing result. A flexure bearing portion may be provided in the crossbar adjacent the connection between the crossbar and the frame, thereby to prevent a bending of the crossbar from being transmitted to flexure bearing means that pivotally connect the force-transmitting step-up lever with the crossbar.

BRIEF DESCRIPTION OF THE DRAWING

Other objects and advantages of the invention will become apparent from a study of the following specification when viewed in the light of the accompanying drawing, in which:

FIG. 1 is a diagrammatic illustration of the weighing apparatus of the present invention;

FIG. 2 is a detailed perspective view illustrating the crossbar arrangement for supporting the force-transmitting lever of FIG. 1;

FIG. 3 is a detailed view of a modification of the crossbar means of FIG. 2;

DETAILED DESCRIPTION

Figure 4:
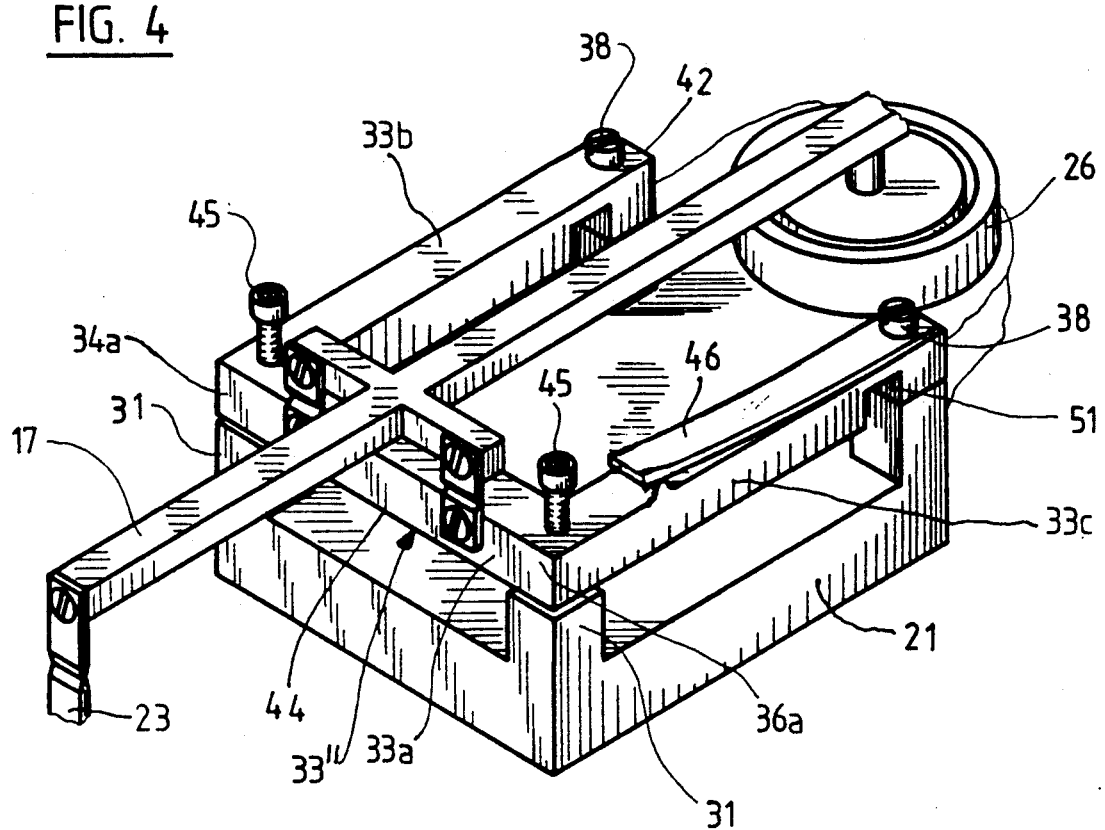
FIG. 4 is a detailed perspective view of another crossbar embodiment having a generally U-shaped configuration.

Referring first and more particularly to FIGS. 1 and 2, the weighing apparatus 2 of the present invention includes a frame 9 having a housing 1 provided with a weighing chamber 3, and keyboard means 5 for inputting instructions and information to electronic control and measuring means contained within housing chamber 7. A weighing pan 28 mounted in the weighing chamber 3 is connected by arm 29 with a load receiving member 15, which is guided for vertical movement relative to the frame by parallel guide means 11 containing flexure bearing means 13, as is known in the art. A force transmitting step-up or amplifying lever 17 is pivotally suspended intermediate its ends from crossbar 33 by flexure bearing means 19. At one end, the force-transmitting lever 17 is connected with the load receiver 15 by flexure bearing means 23, and at its other end, the lever 17 is provided with a position measuring lug 27 that is arranged in the field of stationary photocell means (not shown) that is connected with position sensing means P, as is known in the art. An electrical signal from the position sensing means is transmitted to weight measuring means W which transmits an electromagnetic load compensation signal to a coil 25 arranged in a stationary magnetic field provided by the fixed magnet means 26, which coil is connected with the force-transmitting lever 17. The amount of current required to return the lever 17 to its initial no-load position is a function of the magnitude of the load to be measured, as displayed on the display means D. Such electromagnetic load compensation means are well known in the art, and comprise no part of the present invention.

In accordance with the present invention, adjusting means are provided in the form of an adjusting screw 45 (FIG. 2) for adjusting the position of the crossbar 33 relative to the console portion 21 of the frame 9. As shown in FIG. 2, the console 21 includes a pair of vertical pillars 31 between the ends of which the crossbar 33 is supported. At one end 36, the crossbar is provided with an adjusting screw 45 which passes downwardly through a threaded bore for engagement at its lower extremity with the upper surface of the associated pillar 31. At its other end 34, the crossbar is secured to the associated vertical pillar 31 by screw 35. The portion 51 of the crossbar 33 adjacent the end 34 is formed to define integral flexure bearing means 51, which define a horizontal pivot axis which permits vertical movement of the right hand end 36 of the crossbar, as controlled by the adjusting screw 45. In order to fasten the right hand end of the crossbar in position following vertical adjustment by the adjusting screw 45, there is provided a fastening screw 37 which extends through an oversize bore within the crossbar end portion 36 for threaded engagement within a corresponding threaded bore contained in the associated pillar 31. A counter balancing weight 49 is threadably supported for vertical movement on the vertical screw 47 the lower end of which is connected with the force transmitting lever 17. Helical spring 43 mounted concentrically on screw 37 between the head portion thereof and the associated end portion 36 of cross bar 33 serves to bias the cross bar downwardly toward the associated pillar 31. Alternatively, the adjusting screw 45 may be provided with differential threads for engagement with corresponding threaded bores in the end portion 36 and the vertical pillar 31, respectively.

In operation, with the fastening screw 37 released from the associated pillar 31, the adjusting screw 45 is rotated to vertically pivot the end 36 of crossbar 33 relative to pillar 31, thereby to properly compensate for any unequal leveling of the frame 9 which would adversely effect the weighing measurement. Following operation of the adjustment screw 45, the fastening screw is rotated to lock the right hand end of the crossbar in place.

Referring now to the modification of FIG. 3, at its left hand end adjacent the flexible bearing 51, the crossbar 33' extends within a recess 59 contained in the associated vertical pillar 31' and a fastening screw 35 extends with small clearance horizonally through the end portion 34' of the crossbar 33'. In this embodiment, the pivot axis defined by the flexure bearing means 51 is vertical, and at its right hand end 36', the fastening screw 37 extends through an oversize bore in the crossbar 33' for threaded engagement within a corresponding threaded bore contained in the associated vertical pillar 31'. Thus, screw 35 forms a pivot for crossbar 33' when the right hand adjusting screw 45 is rotated. Similarly, if desired, the left hand screw 35 may extend through an oversized bore contained in the crossbar end portion 34' for engagement within a corresponding threaded bore in the associated vertical pillar 31', and the right hand screw 37 has a small clearance in crossbar 33', whereupon the left hand screw 45 will serve for adjustment. In the illustrated embodiment, adjusting screws 45 are provided at each end of the crossbar 33', either of which may be used for adjustment as discussed above. Thus, after the cross bar is adjusted by the adjusting means 45 as described above, the fastening screws 35 and 37 are tightened to lock the cross bar in place.

Figure 5:
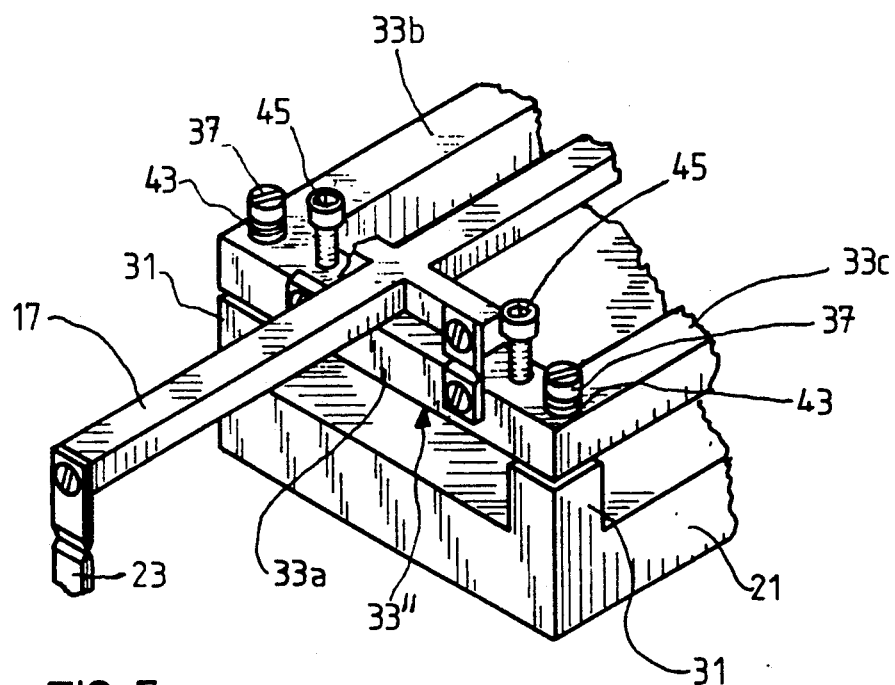
FIG. 5 is a detailed view of a modification of the apparatus of FIG. 4.

Referring now to the embodiment of FIGS. 4 and 5, the crossbar member 33" is of U-shaped configuration including a base portion 33a, and a pair of arm portions 33b and 33c, respectively. The free ends of the arm portions 33b and 33c are connected with vertical pillars on the console 21 by fastening screws 38, respectively and adjusting screws 45 are provided at the end portions 34a and 36a of the base portion 33a for cooperation with corresponding pillars 31 on the frame console 21. Spring means—such as the leaf spring 46—serve to bias the base portion 33a downwardly toward the vertical pillars 31. Although one leaf spring 46 has been illustrated in FIG. 4, it is apparent that the arm 33b can similarly be provided with a leaf spring, if desired.

In the modification of FIG. 5, fastening screws 37 are provided at the junctions between the base portion and the arm portions 33b and 33c, respectively, in the same manner as shown in FIG. 2.

In this embodiment, the adjusting screws 45 are operated to properly orient the base portion of the crossbar, whereupon the fastening screws 37 are tightened until a predetermined stressing force is applied to the adjusting screws 45.

For adjusting the weighing apparatus of any of the embodiments disclosed above, the frame is placed on a support that can be tilted about each of two orthogonally arranged axes. The indication of the deviation of the zero or null point is determined along the longitudinal axis and is adjusted into tolerance by rotation of the balancing nut 49. Then the reading of the deviation of the zero or null point is determined during tilting along the lateral axis. Depending on the deflection, crossbar 33 is raised or lowered by means of the adjusting screw 45, until the reading comes within the tolerance value along this axis. Subsequently, the operator can once again check through the deviation along the longitudinal axis and the centering of gravity of the force-transmitting bar 17 can be readjusted by means of screw 49.

In place of the adjusting screw 45, it is apparent that other adjusting means might be used (for example, movable wedges positioned between the ends of the crossbar and the support pillars 31).

While in accordance with the provisions of the Patent Statutes the preferred forms and embodiments of the invention have been illustrated and described, it will be apparent to those skilled in the art that various modifications may be made in the apparatus described above.

What is claimed is:

1. Weighing apparatus, comprising:
   (a) a frame (9) having at least two vertical laterally-spaced pillars (31);
   (b) load receiving means (15);
   (c) parallel guide means (11) connecting said load receiving means for vertical movement relative to said frame;
   (d) a generally horizontal crossbar (33) supported at opposite ends by, and extending between, said pillars;
   (e) a force transmitting lever (17);
   (f) means (19) connecting said lever with said crossbar for pivotal movement about generally horizontal pivot axis and means 23 connecting said lever with said load receiving means,
   (g) adjusting means (45) for varying the vertical position of at least one end of said crossbar relative to its associated pillar; and
   (h) measuring means responsive to the displacement of said lever relative to said frame upon the application of a load to said load receiver means for measuring the magnitude of said load.

2. Apparatus as defined in claim 1, wherein said crossbar adjusting means includes at least one adjusting screw (45) connected with said crossbar for engagement with a corresponding one of said pillars.

3. Apparatus as defined in claim 2, wherein said adjusting screw is arranged adjacent one end of said crossbar, and further including screw means (35) connecting the other end of said crossbar with the associated pillar to permit pivotal movement of said crossbar by said adjusting screw about a horizontal axis adjacent said screw means.

4. Apparatus as defined in claim 1, wherein said crossbar contains a portion (51) adjacent one end thereof defining a flexure bearing.

5. Apparatus as defined in claim 1, and further including at least one fastening screw (37) for rigidly connecting said crossbar with said frame following the adjustment thereof by said adjusting means.

6. Apparatus as defined in claim 1, and further including leaf spring means (46) biasing at last one portion of said crossbar toward an associated pillar.

7. Apparatus as defined in claim 1, wherein said crossbar has a U-shaped configuration having a base portion and a pair of parallel arm portions, said crossbar generally being arranged in a horizontal plane; and further including first screw means (38) connecting the ends of said cross bar portions with said frame, said adjusting means comprising a pair of adjusting screws (45) arranged adjacent the junctions between said arm portions and said base portion, respectively.

8. Apparatus as defined in claim 7, and further wherein said crossbar arm portions contain flexure bearings (51) adjacent the free extremities of said arm portions, respectively.

* * * * *